(12) United States Patent
Moriya et al.

(10) Patent No.: US 11,801,872 B2
(45) Date of Patent: Oct. 31, 2023

(54) VEHICLE CONTROL APPARATUS

(71) Applicant: SUBARU CORPORATION, Tokyo (JP)

(72) Inventors: Fumiyuki Moriya, Tokyo (JP); Hirofumi Yabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/231,094

(22) Filed: Apr. 15, 2021

(65) Prior Publication Data

US 2021/0331710 A1    Oct. 28, 2021

(30) Foreign Application Priority Data

Apr. 23, 2020 (JP) ................................. 2020-076646

(51) Int. Cl.
*B60W 60/00* (2020.01)
*G05D 1/00* (2006.01)
(Continued)

(52) U.S. Cl.
CPC ........ *B60W 60/0051* (2020.02); *B60W 30/06* (2013.01); *B60W 30/08* (2013.01); *B60W 30/09* (2013.01); *B60W 40/08* (2013.01); *B60W 60/0059* (2020.02); *G05D 1/0011* (2013.01); *G05D 1/0061* (2013.01); *B60W 50/12* (2013.01);
(Continued)

(58) Field of Classification Search
CPC .............. G05D 1/0011; G05D 1/0061; G05D 2201/0213; B60W 50/12; B60W 2540/26; B60W 2756/10; B60W 60/0051; B60W 60/0059; B60W 60/007; B60Y 2302/05; B60K 28/06
See application file for complete search history.

(56) References Cited

U.S. PATENT DOCUMENTS

2016/0139594 A1\* 5/2016 Okumura .............. B60W 30/00 701/2
2019/0212732 A1\* 7/2019 Takanashi ................ G08G 1/09
(Continued)

FOREIGN PATENT DOCUMENTS

| JP | 11-195198 A | 7/1999 |
|---|---|---|
| JP | 2016057673 A  \* | 4/2016 |
| WO | 2018/147041 A1 | 8/2018 |

OTHER PUBLICATIONS

English Translation: Fujisawa et al. JP 2016-57673 A, Apr. 2016, Japanese Patent Office Publication (Year: 2016).\*

(Continued)

*Primary Examiner* — Nadeem Odeh
(74) *Attorney, Agent, or Firm* — TROUTMAN PEPPER HAMILTON SANDERS LLP

(57) ABSTRACT

A vehicle control apparatus includes a driving-assist control unit and a remote control unit. The driving-assist control unit is configured to perform an automatic driving control of stopping a vehicle in accordance with detection of an abnormal state of a driver of the vehicle while the vehicle is traveling. The remote control unit is configured to perform a control of transmitting remote control permission notification after the vehicle is stopped by the automatic driving control. The remote control permission notification permits a remote control of the vehicle.

18 Claims, 5 Drawing Sheets

| | OUTSIDE TEMPERATURE CONDITION | | POSITION CONDITION | | | GRADIENT CONDITION | |
|---|---|---|---|---|---|---|---|
| | OUTSIDE TEMPERATURE (LOW) | OUTSIDE TEMPERATURE (HIGH) | EXPRESSWAY | COLD REGION | TROPICAL REGION | SLOPED ROAD | FLAT ROAD |
| AIR HEATING FUNCTION | PERMIT | NOT PERMIT | ASSOCIATED WITH OUTSIDE TEMPERATURE CONDITION | PERMIT | NOT PERMIT | ASSOCIATED WITH OUTSIDE TEMPERATURE CONDITION | ASSOCIATED WITH OUTSIDE TEMPERATURE CONDITION |
| AIR COOLING FUNCTION | NOT PERMIT | PERMIT | ASSOCIATED WITH OUTSIDE TEMPERATURE CONDITION | NOT PERMIT | PERMIT | ASSOCIATED WITH OUTSIDE TEMPERATURE CONDITION | ASSOCIATED WITH OUTSIDE TEMPERATURE CONDITION |
| ISS FUNCTION | PERMIT | NOT PERMIT | NOT PERMIT | PERMIT | NOT PERMIT | ASSOCIATED WITH OUTSIDE TEMPERATURE CONDITION AND POSITION CONDITION | ASSOCIATED WITH OUTSIDE TEMPERATURE CONDITION AND POSITION CONDITION |
| TRAVELING FUNCTION | NOT PERMIT | NOT PERMIT | PERMIT | PERMIT | PERMIT | ASSOCIATED WITH OUTSIDE TEMPERATURE CONDITION AND POSITION CONDITION | ASSOCIATED WITH OUTSIDE TEMPERATURE CONDITION AND POSITION CONDITION |
| EPB FUNCTION | PERMIT | NOT PERMIT | NOT PERMIT | PERMIT | NOT PERMIT | PERMIT | NOT PERMIT |

(51) Int. Cl.
  *B60W 30/09*    (2012.01)
  *B60W 40/08*    (2012.01)
  *B60W 30/08*    (2012.01)
  *B60W 30/06*    (2006.01)
  B60W 50/12      (2012.01)
  B60W 50/00      (2006.01)

(52) U.S. Cl.
  CPC ............. *B60W 2040/0818* (2013.01); *B60W 2050/0071* (2013.01); *B60W 2540/221* (2020.02); *B60W 2540/229* (2020.02); *B60W 2540/26* (2013.01); *B60W 2756/10* (2020.02); *B60Y 2302/05* (2013.01); *G05D 2201/0213* (2013.01)

(56) References Cited

U.S. PATENT DOCUMENTS

| | | | |
|---|---|---|---|
| 2020/0004269 A1 | 1/2020 | Oba | |
| 2020/0209847 A1* | 7/2020 | Park | G08G 1/166 |
| 2020/0310431 A1* | 10/2020 | Matsunaga | G05D 1/0088 |
| 2021/0294319 A1* | 9/2021 | Pfadler | G05D 1/0022 |
| 2022/0001900 A1* | 1/2022 | Shimotani | B60W 50/14 |

OTHER PUBLICATIONS

Notice of Reasons for Refusal issued in Japanese Patent Application No. 2020-076646 dated Aug. 29, 2023, with machine translation.

\* cited by examiner

| | OUTSIDE TEMPERATURE CONDITION | | POSITION CONDITION | | | GRADIENT CONDITION | |
|---|---|---|---|---|---|---|---|
| | OUTSIDE TEMPERATURE (LOW) | OUTSIDE TEMPERATURE (HIGH) | EXPRESSWAY | COLD REGION | TROPICAL REGION | SLOPED ROAD | FLAT ROAD |
| AIR HEATING FUNCTION | PERMIT | NOT PERMIT | ASSOCIATED WITH OUTSIDE TEMPERATURE CONDITION | PERMIT | NOT PERMIT | ASSOCIATED WITH OUTSIDE TEMPERATURE CONDITION | ASSOCIATED WITH OUTSIDE TEMPERATURE CONDITION |
| AIR COOLING FUNCTION | NOT PERMIT | PERMIT | ASSOCIATED WITH OUTSIDE TEMPERATURE CONDITION | NOT PERMIT | PERMIT | ASSOCIATED WITH OUTSIDE TEMPERATURE CONDITION | ASSOCIATED WITH OUTSIDE TEMPERATURE CONDITION |
| ISS FUNCTION | PERMIT | NOT PERMIT | NOT PERMIT | PERMIT | NOT PERMIT | ASSOCIATED WITH OUTSIDE TEMPERATURE CONDITION AND POSITION CONDITION | ASSOCIATED WITH OUTSIDE TEMPERATURE CONDITION AND POSITION CONDITION |
| TRAVELING FUNCTION | NOT PERMIT | NOT PERMIT | PERMIT | PERMIT | PERMIT | ASSOCIATED WITH OUTSIDE TEMPERATURE CONDITION AND POSITION CONDITION | ASSOCIATED WITH OUTSIDE TEMPERATURE CONDITION AND POSITION CONDITION |
| EPB FUNCTION | PERMIT | NOT PERMIT | NOT PERMIT | PERMIT | NOT PERMIT | PERMIT | NOT PERMIT |

FIG. 5

VEHICLE CONTROL APPARATUS

CROSS-REFERENCE TO RELATED APPLICATIONS

The present application claims priority from Japanese Patent Application No. 2020-076646 filed on Apr. 23, 2020, the entire contents of which are hereby incorporated by reference.

BACKGROUND

The technology relates to a vehicle control apparatus for a remote controllable vehicle.

A technique is known that performs, upon detection of abnormality such as loss of consciousness of a driver, a control of stopping a traveling vehicle to thereby allow for prevention of a subsequent accident, for example.

Japanese Unexamined Patent Application Publication No. H11-195198 discloses a technique that causes, upon determination of an abnormal state of a driver, a vehicle-side apparatus and an apparatus on an operation management center side to perform bidirectional communication with each other, and thus performs a remote control to stop a traveling vehicle.

SUMMARY

An aspect of the technology provides a vehicle control apparatus that includes a driving-assist control unit and a remote control unit. The driving-assist control unit is configured to perform an automatic driving control of stopping a vehicle in accordance with detection of an abnormal state of a driver of the vehicle while the vehicle is traveling. The remote control unit is configured to perform a control of transmitting remote control permission notification after the vehicle is stopped by the automatic driving control. The remote control permission notification permits a remote control of the vehicle.

An aspect of the technology provides a vehicle control apparatus includes circuitry. The circuitry is configured to perform an automatic driving control of stopping a vehicle in accordance with detection of an abnormal state of a driver of the vehicle while the vehicle is traveling. The circuitry is configured to perform a control of transmitting remote control permission notification after the vehicle is stopped by the automatic driving control. The remote control permission notification permits a remote control of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 5 is a diagram illustrating whether each operation function is permittable in accordance with a satisfaction state of each condition according to one embodiment of the technology.

DETAILED DESCRIPTION

Figure 1:
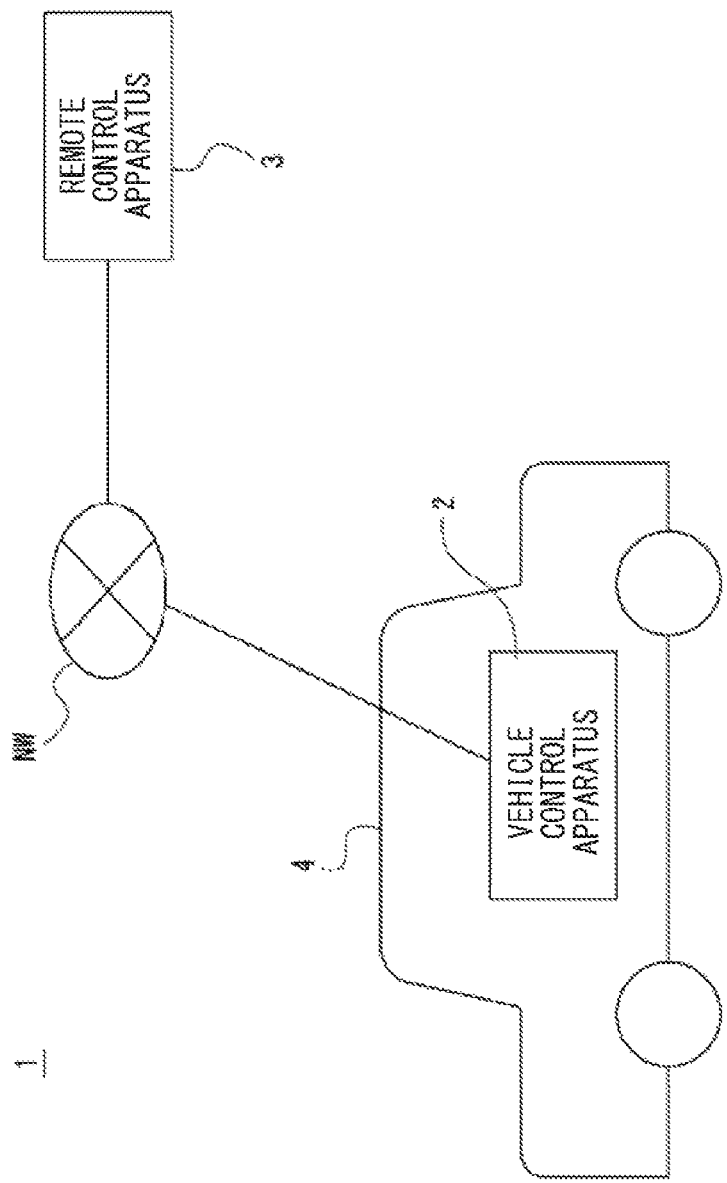
FIG. 1 is a diagram illustrating an example of an outline of a vehicle control system according to one embodiment of the technology.

For example, stopping a vehicle with an unconscious driver in a heavy snow environment can lead to a second disaster such as hypothermia of an occupant such as the driver due to a decrease in vehicle inside temperature.

To address such a situation, it may be desired to permit a remote control of the stopped vehicle in order to secure safety of the occupant such as the driver. Such a remote control may be performed, for example, by an operator outside the vehicle. However, unreasonable permission for the remote control of the vehicle can increase a possibility of misuse of the remote control, which is inappropriate.

It is desirable to provide a vehicle control apparatus that allows for appropriate-timing permission for a remote control of a vehicle.

Some example embodiments of the technology are described below with reference to FIGS. 1 to 5. Note that the following description is directed to illustrative examples of the disclosure and not to be construed as limiting to the technology. Each configuration illustrated in the drawings referred to in the following description is partial extraction of a configuration of the example embodiment, and is modifiable in a variety of ways in accordance with a design or any other factor as long as the modification does not derive from the technical idea of the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting the technology. Further, elements in the following example embodiments which are not recited in a most-generic independent claim of the disclosure are optional and may be provided on an as-needed basis.

Configuration once described may be denoted with the same numerals to avoid any redundant description. Moreover, embodiments of the technology are not limited to those described below and encompass modifications, alternations, etc. in a range that allows for achievement of what may be desired by the embodiments of the technology.

A description is given below of an example of a configuration of a vehicle control system 1 according to an example embodiment of the technology with reference to FIG. 1.

The vehicle control system 1 may include a vehicle control apparatus 2 and a remote control apparatus 3. The vehicle control apparatus 2 may be provided on a vehicle 4. The vehicle control apparatus 2 may control various operation functions of the vehicle 4 on the basis of, for example but not limited to, an operation input performed by an occupant such as a driver of the vehicle 4.

The operation functions described here may refer to various control functions for operation of the vehicle 4 which is controllable by means of operation performed by the driver or operation performed by an operator present at a distant location. Examples of the operation functions may include: a traveling function that performs various controls related to traveling of an own vehicle; an air heating function and an air cooling function that adjust air conditioning inside a vehicle; an idling stop system (ISS) function that performs an idling stop control; and an electronic parking brake (EPB) function that controls an EPB.

The vehicle control apparatus 2 performs an automatic driving control of stopping the vehicle 4 in accordance with detection of an abnormal state of a driver while the vehicle 4 is traveling.

The remote control apparatus 3 and the vehicle control apparatus 2 may be configured to perform mutual communication via a network NW. The remote control apparatus 3 is configured to perform a remote control of the vehicle 4 in accordance with remote control permission notification supplied from the vehicle control apparatus 2 after the vehicle 4 is stopped by the automatic driving control. The remote control apparatus 3 may perform a remote control of various operation functions of the vehicle 4 in accordance with an operation input performed by, for example but not limited to, an operator present at a distant location.

Figure 2:
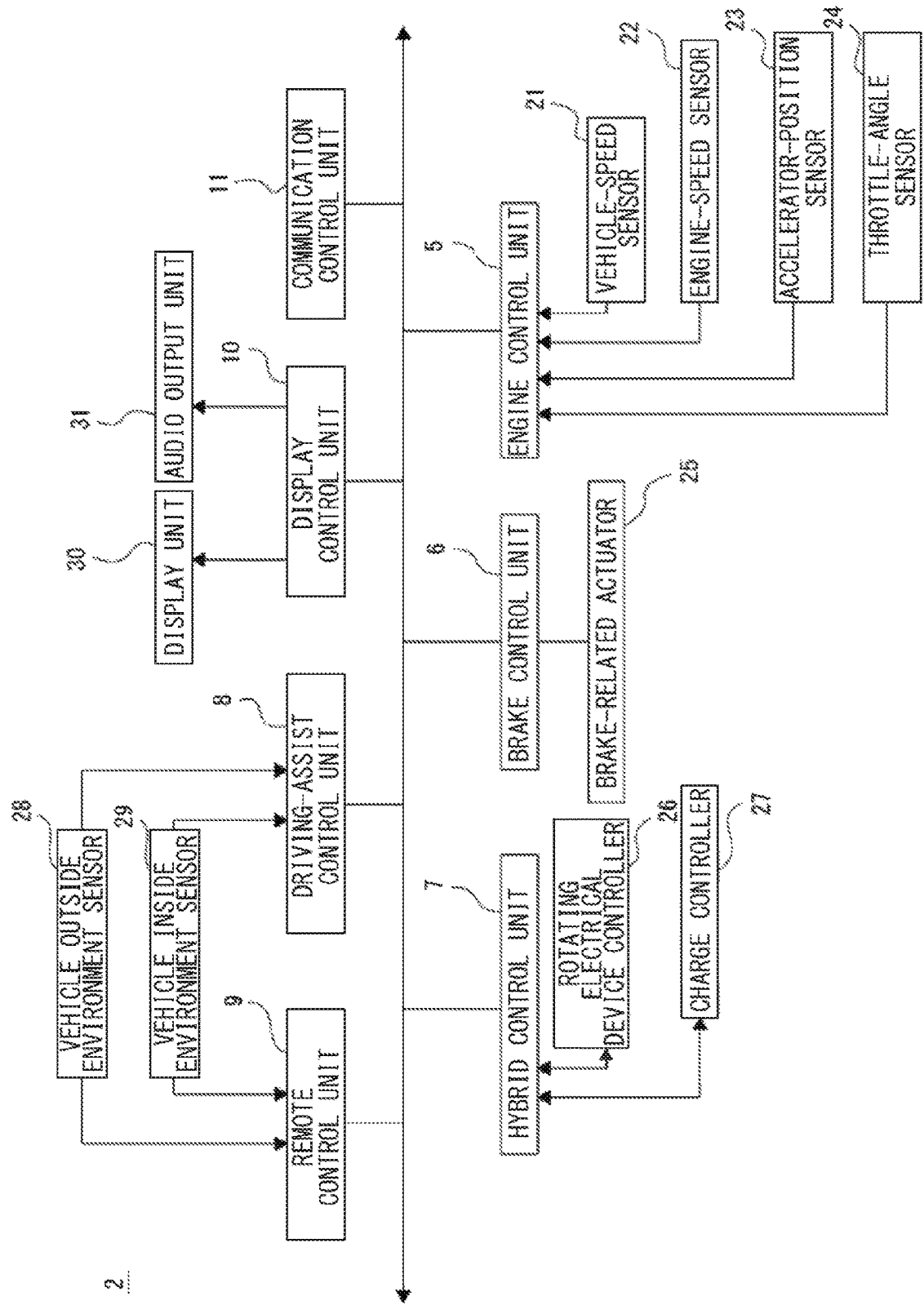
FIG. 2 is a block diagram illustrating an example of a configuration of a vehicle control apparatus according to one embodiment of the technology.

A description is given of an example of a configuration of the vehicle control apparatus 2 according to the example embodiment with reference to FIG. 2.

The vehicle control apparatus 2 may be provided on the vehicle 4 which is, for example, a hybrid electric vehicle that includes an engine and a rotating electrical device as power sources for driving wheels. The vehicle control apparatus 2 may include an engine control unit 5, a brake control unit 6, a hybrid control unit 7, a driving-assist control unit 8, a remote control unit 9, a display control unit 10, and a communication control unit 11. These control units may each include a microcomputer including, for example, a central processing unit (CPU), a read-only memory (ROM), and a random-access memory (RAM). These control units may be coupled to each other via a bus wiring to perform mutual communication.

Although the example embodiment is described with reference to an example case where the vehicle 4 is a hybrid electric vehicle, the example embodiment is also applicable to various vehicles including, without limitation: a vehicle including only an engine as a power source for driving wheels; and an electric vehicle including only a rotating electrical device as a power source for driving wheels.

The engine control unit 5 may perform various engine drive controls for the engine of the vehicle 4 including, without limitation, a fuel injection control, an ignition control, and a suction-air amount adjustment control. Coupled to the engine control unit 5 may be various sensors related to an engine control including, without limitation: a vehicle-speed sensor 21 that detects a traveling speed of the vehicle 4 as a vehicle speed; an engine-speed sensor 22 that detects a speed of the engine; an accelerator-position sensor 23 that detects an amount of depression of an accelerator pedal as an accelerator position; and a throttle-angle sensor 24 that detects an angle of a throttle valve as a throttle angle. The engine control unit 5 may use detected values of these sensors to perform the engine drive controls.

The engine control unit 5 may control various actuators, which are each provided as an engine-related actuator, on the basis of, for example: a detection signal from any of the various sensors described above; data of an operation input performed by an occupant such as a driver; or a control signal supplied from the remote control unit 9. The engine control unit 5 may supply the detected values of the various sensors to a predetermined control unit via the bus wiring on an as-needed basis.

The brake control unit 6 may control various actuators, which are each provided as a brake-related actuator 25, on the basis of, for example: a detection signal from a predetermined sensor; data of an operation input performed by an occupant such as a driver; or a control signal supplied from the remote control unit 9. Examples of the brake-related actuator 25 may include a hydraulic control actuator adapted to control, for example, an output hydraulic pressure from a brake booster to a master cylinder or a hydraulic pressure in a brake fluid pipe.

The brake control unit 6 may also perform other controls including, without limitation: an automatic braking control to avoid a contact of the vehicle with another object or to stop a vehicle on the basis of a control signal supplied from the driving-assist control unit 8; a braking control based on data of an operation input performed by an occupant such as a driver or a control signal supplied from the remote control unit 9; and a parking maintaining control using the EPB.

The hybrid control unit 7 may give an instruction to the engine control unit 5, a rotating electrical device controller 26, and a charge controller 27 on the basis of, for example: a detection signal from a predetermined sensor; data of an operation input performed by an occupant such as a driver; or a control signal supplied from the remote control unit 9, to control operation of the vehicle 4.

The rotating electrical device controller 26 may perform a drive control of a rotating electrical device for traveling provided in the vehicle 4, such as a motor-generator, on the basis of a control signal supplied from the hybrid control unit 7.

The charge controller 27 may perform a charging control of a high-voltage battery on the basis of a control signal supplied from the hybrid control unit 7. The high-voltage battery may be provided in the vehicle 4 as a power source of the rotating electrical device. In one non-limiting example, the charge controller 27 may perform a control of charging the high-voltage battery on the basis of electric power generated by regenerative rotation of the rotating electrical device such as the motor-generator.

The hybrid control unit 7 may calculate required torque T (i.e., torque to be outputted to the wheels) in accordance with an amount of operation performed on the accelerator by the driver, on the basis of an accelerator position value received from the engine control unit 5. The hybrid control unit 7 may cause the engine control unit 5 and the rotating electrical device controller 26 to execute an operation control of the engine and the rotating electrical device for causing the vehicle 4 to travel with use of required driving force corresponding to the calculated required torque T. The hybrid control unit 7 may also cause, on the basis of a state of charge (SOC) of the high-voltage battery, the charge controller 27 to execute the control of charging the high-voltage battery.

The driving-assist control unit 8 may perform various driving-assist controls including, without limitation, an automatic-cruise control and a steering-assist control with use of a detected value of a vehicle outside environment sensor 28.

The vehicle outside environment sensor 28 may comprehensively refer to sensors including, without limitation, a vehicle outside imaging sensor, an outside temperature sensor, a global positioning system (GPS) sensor, and a gradient sensor. The vehicle outside imaging sensor may be, for example, an imaging device adapted to detect: an object that is present outside the vehicle, such as a preceding vehicle, a pedestrian, or a lane; weather outside the vehicle, such as sunny weather, rainy weather, or snowy weather; or a situation outside the vehicle such as submersion or snow accumulation. The vehicle outside imaging sensor may detect a temperature outside the vehicle. The GPS sensor may measure positions on the basis of latitude, longitude, and altitude. The gradient sensor may detect a gradient of a road on which the own vehicle is traveling, and may be a gyro sensor, for example.

Note that the sensor used to detect an object is not limited to the imaging device, and may be any other sensor such as a milliwave radar.

The driving-assist control unit 8 may control any unit to be used for the driving-assist control for operation such as acceleration, braking, or steering, on the basis of data such as data of an object detected on the basis of a detected value of the vehicle outside imaging sensor of the vehicle outside environment sensor 28, for example.

The driving-assist control unit 8 may also detect an abnormal state of the driver while the vehicle 4 is traveling. The abnormal state of the driver may refer to, for example but not limited to, a state in which it is highly possible that the driver is unable to perform driving operation. Examples of such a state may include: an unconscious state of the driver due to a cause such as an acute disease or a faint; and a non-concentrating state of the driver in which the driver is not able to concentrate on driving due to drowsing or looking into another direction.

The driving-assist control unit 8 may use, for example, a detected value of a vehicle inside environment sensor 29 to detect the abnormal state of the driver.

The vehicle inside environment sensor 29 may comprehensively refer to sensors including, without limitation: a pulse sensor that detects a pulse of the driver; a body temperature sensor that detects a body temperature of the driver; a vehicle inside imaging sensor such as an imaging device that detects expression or an attitude of the driver; an on-vehicle microphone that acquires audio data of the driver or any other audio data; and a steering angle sensor that detects a steering angle to determine abnormality of steering operation.

Upon detecting the abnormal state of the driver on the basis of data such as a detected value of any of the various sensors of the vehicle inside environment sensor 29, the driving-assist control unit 8 may perform the automatic driving control of stopping the traveling vehicle 4. The driving-assist control unit 8 may detect the abnormal state of the driver by means of, for example, a driver monitoring system (DMS) using a sensor such as the vehicle inside imaging sensor.

The remote control unit 9 may perform a control of transmitting remote control permission notification after the vehicle 4 is stopped by the automatic driving control performed by the driving-assist control unit 8. The remote control permission notification may permit a remote control of the vehicle 4. The remote control apparatus 3 may receive the remote control permission notification transmitted by the above-described control, performed by the remote control unit 9. The reception of the remote control permission notification by the remote control apparatus 3 may allow for the remote control of the vehicle 4 based on an operation input performed, for example, by an operator present at a distant location.

In this case, the remote control unit 9 may set an operation function that is remotely controllable on the remote control apparatus 3 side, in accordance with a satisfaction state of a predetermined condition. The remote control unit 9 may perform the control of transmitting the remote control permission notification for the operation function set to be remotely controllable.

Here, the predetermined condition may refer to a condition that serves as a reference for setting the operation function of the vehicle 4 for which the remote control is permitted. Examples of such a predetermined condition may include: an outside temperature condition related to a temperature outside the vehicle 4; a position condition related to a position where the vehicle 4 is stopped; and a gradient condition related to a gradient of the position where the vehicle 4 is stopped. The operation function for which the remote control is permitted is hereinafter also referred to as a "permitted operation function".

For example, the remote control unit 9 may set the permitted operation function on the basis of comparison between: detected data from any of the various sensors of the vehicle outside environment sensor 28 such as outside temperature data, position data, or gradient data; and the predetermined condition which has been set in advance such as the outside temperature condition, the position condition, or the gradient condition. The remote control unit 9 may thus set, as the permitted operation function, any of the various operation functions of the vehicle 4 including, without limitation, the air heating function, the air cooling function, the ISS function, and the EPB function.

This may limit the operation function of the vehicle 4 remotely controllable, for example, by operation performed by an operator present at a distant location, in accordance with an environment in which the vehicle 4 is stopped.

Note that, although the description above refers to an example case where the remote control unit 9 may perform the above-described process, this is non-limiting. In one example embodiment, the driving-assist control unit 8 may perform the above-described process.

The display control unit 10 may perform a display control for various display units 30 provided in a part such as a meter panel in the vehicle 4. Non-limiting examples of the display units 30 may include: a multi-function display (MFD); various meters provided in the meter panel including, without limitation, a speedometer and a tachometer; and any other display device adapted to present information to the occupant such as the driver.

In one example embodiment, the display control unit 10 may so perform a control that any of the display units 30 displays a warning to the occupant such as the driver, in accordance with an instruction given from the driving-assist control unit 8.

The display control unit 10 may also perform a control of audio output, such as navigation audio, of an audio output unit 31 provided in the vehicle 4. The audio output unit 31 may include, for example, a sound source, an audio signal processor, and a speaker.

The display control unit 10 may be configured to so perform a control that the audio output unit 31 outputs a warning sound to the occupant such as the driver, in accordance with a control signal supplied from the driving-assist control unit 8.

The communication control unit 11 may be configured to perform communication with an external apparatus such as the remote control apparatus 3. The communication control unit 11 may include an antenna, and may be configured to perform wireless communication with the external apparatus via the antenna.

The communication control unit 11 may perform communication with the remote control apparatus 3, for example, to thereby transmit, to the remote control apparatus 3, data related to an operation function for which the remote control is to be permitted by a control signal supplied from the remote control unit 9. The communication control unit 11 may also perform the communication with the remote control apparatus 3, for example, to thereby receive, from the remote control apparatus 3, remote control data of the vehicle 4 based on data related to input operation performed by an operator present at a distant location.

A description is given below of an example of a process to be performed by the vehicle control apparatus 2 according to the example embodiment of the technology, with reference to FIGS. 3 and 4.

In this example, a driving-assist control process, a detection process, and a dead-man control process performed by the vehicle control apparatus 2 may be performed by the driving-assist control unit 8 in parallel. A remote control process and a communication control process performed by the vehicle control apparatus 2 may be performed by the remote control unit 9.

First, in step S101, the vehicle 4 may have been set in a driving-assist control mode by operation such as setting operation performed by the driver. The driving-assist control unit 8 of the vehicle control apparatus 2 may perform, as the driving-assist control process, various driving-assist controls including, without limitation, an automatic-cruise control in the driving-assist control mode.

In step 102 in the driving-assist control mode, the driving-assist control unit 8 may acquire vehicle inside environment data from a sensor such as the vehicle inside environment sensor 29 in order to perform a process of detecting an abnormal state of the driver.

As the vehicle inside environment data, the driving-assist control unit 8 may acquire, for example: pulse data of the driver from the pulse sensor; body temperature data of the driver from the body temperature sensor; data related to expression or an attitude of the driver from the vehicle inside imaging sensor; audio data of the driver or any other audio data from the on-vehicle microphone; and the steering angle from the steering angle sensor.

In step S103, the driving-assist control unit 8 may determine whether the driver is in the abnormal state on the basis of the acquired vehicle inside environment data.

The driving-assist control unit 8 may determine that the driver is in the abnormal state, for example: in a case where the pulse or the body temperature of the driver is outside a preset normal range; in a case where the expression of the driver is determined as a suffering expression, etc. on the basis of an image analysis process performed on the acquired image data; in a case where the driver has an attitude of hunching over the steering wheel; and in a case where the driver is determined as being groaning or calling for help on the basis of an audio analysis process performed on the acquired audio data.

Further, the driving-assist control unit 8 may perform a control such as a control of displaying a warning screen on any of the display units 30, or a control of outputting a warning sound from the audio output unit 31, for example, in a case where a predetermined time period elapses without any change in steering angle that is determinable as steering operation performed by the driver. Further, in a case where no steering operation by the driver is detected even with a lapse of a predetermined time period from the display of the warning screen or the output of the warning sound, the vehicle control apparatus 2 may determine that the driver is in the abnormal state.

Thereafter, the driving-assist control unit 8 may repeatedly perform the processes from step S102 to step S104 until the driving-assist control unit 8 detects the abnormal state of the driver on the basis of the determination results described above.

Upon detecting the abnormal state of the driver in step S104, the driving-assist control unit 8 may switch a driving-control-related mode from the driving-assist mode to a dead-man control mode, as the dead-man control process in step S105. In the dead-man control mode, the automatic driving control of stopping the vehicle 4 may be performed.

Upon switching the driving-control-related mode to the dead-man control mode, the driving-assist control unit 8 may perform the automatic driving control of stopping the vehicle 4 in step S106, as the driving-assist control process. In one example, the driving-assist control unit 8 may control a device such as the brake-related actuator 25 on the basis of the dead-man control mode to thereby perform the automatic driving control of stopping the vehicle 4.

Upon performing the driving-assist control based on the dead-man control mode, the driving-assist control unit 8 may determine in step S107 whether deactivation operation has been detected, until the driving-assist control unit 8 detects the stopping of the vehicle 4 by the automatic driving control in step S108. The deactivation operation may be operation that is determinable as being performed by the driver who has recovered from the abnormal state such as loss of consciousness. For example, such deactivation operation may be operation that has been determined as steering operation performed by the driver, on the basis of the variation amount of the steering angle acquired from the steering angle sensor.

In a case where the driving-assist control unit 8 detects the deactivation operation in step S107, the driving-assist control unit 8 may cause the process to proceed to step S101. In step S101, the driving-assist control unit 8 may switch the driving-control-related mode from the dead-man control mode to the driving-assist control mode, and perform the driving-assist control based on the driving-assist control mode.

In a case where the stopping of the vehicle 4 has been detected in step S108, the driving-assist control unit 8 may transmit stopping completion notification to the remote control unit 9 of the vehicle control apparatus 2 in step S109.

Upon receiving the stopping completion notification from the driving-assist control unit 8 in step S109, the remote control unit 9 may switch the driving-control-related mode from the dead-man control mode to a remote control mode in step S110, as the remote control process. The remote control mode may be adapted to permit the remote control of the vehicle 4.

Further, the remote control unit 9 may acquire the vehicle outside environment data from the vehicle outside environment sensor 28 in step S111. Further, in step S112, the remote control unit 9 may determine a satisfaction state of a predetermined condition on the basis of the acquired vehicle outside environment data, and set the permitted operation function of the vehicle 4 on the basis of a result of the determination.

Details of the setting of the permitted operation function in step S112 are described below with reference to FIG. 5. FIG. 5 illustrates whether the remote control is permittable for each operation function in accordance with each condition. As non-limiting examples of the operation function, FIG. 5 refers to the air heating function, the air cooling function, the ISS function, the traveling function, and the EPB function. As non-limiting examples of the condition, FIG. 5 refers to the outside temperature condition, the position condition, and the gradient condition.

Described below is whether the remote control is permittable for each of the operation functions under each of the conditions.

Outside Temperature Condition

The remote control unit 9 may acquire the temperature data from, for example, the outside temperature sensor, and determine whether the outside temperature is high or low, for example, on the basis of comparison between a value of the acquired temperature data and a preset threshold.

In a case where the remote control unit 9 determines that the outside temperature is low, the remote control unit 9 may set, for example, the air heating function, the ISS function, and the EPB function as the permitted operation functions.

Allowing for the remote control of the air heating function helps to prevent a situation such as hypothermia of the driver in the abnormal state due to the cold. Such hypothermia of the driver may be caused, for example, in a case where the driver in the abnormal state is present in the vehicle 4 that is stopped in a situation with a low vehicle outside temperature, for example, during winter season.

In another example case where the vehicle 4 is stopped in a heavy snow region, accumulation of snow around the vehicle 4 may close an exhaust outlet. If the engine keeps running in such a state, an exhaust gas may flow back inside the vehicle 4, causing the occupant such as the driver to be poisoned by carbon monoxide. To address this, the remote control of the ISS function may be allowed. This makes it possible for the idling stop control to stop the engine on the basis of the remote control, helping to prevent a situation such as carbon monoxide poisoning of the occupant such as the driver.

In still another example case where the surface of the traveling road is frozen in a situation with a low vehicle outside temperature, the stopped vehicle 4 may cause a slipping accident, for example. To address this, the remote control of the EPB function may be allowed. This makes it possible for the EPB control to keep the vehicle 4 being stopped safely.

In a case where the remote control unit 9 determines that the outside temperature is high, the remote control unit 9 may set, for example, the air cooling function as the permitted operation function. Allowing for the remote control of the air cooling function helps to prevent a situation such as dehydration of the driver in the abnormal state. Such dehydration of the driver may be caused, for example, in a case where the driver in the abnormal state is present in the vehicle 4 that is stopped in a situation with a high vehicle outside temperature, for example, during summer season.

Position Condition

The remote control unit 9 may acquire the position data including the latitude, the longitude, and the altitude of the vehicle 4 from, for example, the GPS sensor, and check the acquired position data against map data and climate data of the corresponding region received from, for example, the navigation system, to thereby determine a situation at the position where the vehicle 4 is stopped.

The remote control unit 9 may also acquire imaging data around the vehicle 4, for example, from the vehicle outside imaging sensor, and perform an image analysis process on the acquired imaging data, to thereby determine the situation at the position where the vehicle 4 is stopped.

In a case where the remote control unit 9 determines that the position where the vehicle 4 is stopped is in a cold region, the remote control unit 9 may set, for example, the air heating function, the ISS function, the traveling function, and the EPB function as the permitted operation functions.

Allowing for the remote control of the air heating function helps to prevent a situation such as hypothermia of the driver due to the cold resulting from the stopping of the vehicle 4 in the cold region. Allowing for the remote control of the ISS function helps to prevent a situation such as carbon monoxide poisoning of the driver for similar reasons.

Allowing for the remote control of the traveling function helps to move the vehicle 4, in a case where it is snowy, to a position without snow accumulation, making it possible to secure safety of the occupant such as the driver inside the vehicle 4. Allowing for the remote control of the EPB function helps to keep the vehicle 4 being stopped safely by the EPB control, for example, even on a frozen road surface.

In a case where the remote control unit 9 determines that the position where the vehicle 4 is stopped is in a tropical region, the remote control unit 9 may set, for example, the air cooling function and the traveling function as the permitted operation functions.

Allowing for the remote control of the air cooling function helps to prevent a situation such as dehydration of the driver due to the heat resulting from the stopping of the vehicle 4 in the tropical region. Allowing for the remote control of the traveling function helps to move the vehicle 4 stopped in a place with strong sunlight to a place with less sunlight, making it possible to protect the occupant such as the driver from a situation such as dehydration.

In a case where the remote control unit 9 determines that the position where the vehicle 4 is stopped is on an expressway, the remote control unit 9 may set, for example, the traveling function as the permitted operation function.

Allowing for the remote control of the traveling function helps to move the vehicle 4 stopped on a traveling road of the expressway to the side of the road, making it possible to secure safety of the occupant such as the driver inside the vehicle 4.

The remote control unit 9 may determine whether to set each of the air heating function and the air cooling function as the permitted operation function on the basis of, for example: a satisfaction state related to the outside temperature in the outside temperature condition; a satisfaction state related to the cold region in the position condition; and a satisfaction state related to the tropical region in the position condition.

Gradient Condition

The remote control unit 9 may acquire the gradient data of the traveling road of the own vehicle from, for example, the gradient sensor, and determine whether the traveling road of the own vehicle is a sloped road or a flat road, for example, on the basis of comparison between a value of the acquired gradient data and a preset threshold.

In a case where the remote control unit 9 determines that the traveling road of the own vehicle is a sloped road, the remote control unit 9 may set, for example, the EPB function as the permitted operation function.

In a case where the vehicle 4 is stopped on a sloped road, the vehicle 4 may unintentionally move due to the slope. To address this, the remote control of the EPB function may be allowed to turn on the EPB of the stopped vehicle 4 by means of the remote control. This makes it possible to keep the vehicle 4 being stopped safely.

The remote control unit 9 may determine whether to set each of the air heating function and the air cooling function as the permitted operation function on the basis of, for example, the satisfaction state related to the outside temperature in the outside temperature condition. Further, the remote control unit 9 may determine whether to set each of the ISS function and the traveling function as the permitted operation function on the basis of, for example, the satisfaction state related to the outside temperature in the outside temperature condition and the satisfaction state related to the position where the vehicle 4 is stopped in the position condition.

After setting the permitted operation function or the permitted operation functions in accordance with the respective conditions in step S112, the remote control unit 9 may cause the process to proceed to step S113.

In step S113, the remote control unit 9 may set a remote controllable range for the permitted operation function.

The remote controllable range may refer to a range to which the remote control of the permitted operation function of the vehicle 4 is limited. For example, in a case where the traveling function is set as the permitted operation function, examples of the remote controllable range for the traveling function may include: a range to which the maximum vehicle speed is limited; and a range to which a movable distance is limited. For example, the remote control unit 9 may set, on the basis of the data of the position where the vehicle 4 is stopped, the maximum vehicle speed and the maximum movable distance for the traveling of the vehicle 4 to be performed by means of the remote control. For example, the remote control unit 9 may set the maximum vehicle speed to a relatively small value such as 10 km/h and may set the maximum movable distance to a relatively small value such as 2 km in a case where the position where the vehicle 4 is stopped is located in a region, such as an urban region, where it is assumed that the vehicle 4 can be moved to a safe place within a short time. For example, the remote control unit 9 may set the maximum vehicle speed to a relatively great value such as 30 km/h and may set the maximum movable distance to a relatively great value such as 5 km in a case where the position where the vehicle 4 is stopped is in a region, such as a suburban region away from the urban region, where it is assumed that it takes more time to move the vehicle 4 to a safe place.

Thereafter, in step S114, the remote control unit 9 may set reference data to be transmitted to the remote control apparatus 3 while the remote control is permitted. The reference data may refer to data related to the vehicle environment which the operator refers to upon performing an operation input on the remote control apparatus 3 to remotely control various operation functions of the vehicle 4. Examples of such reference data may include: vehicle inside and outside temperature data to be referred to upon remotely controlling a function such as the air heating function or the air cooling function; imaging image data and audio data around the vehicle 4 to be referred to upon remotely controlling a function such as the traveling function or the ISS function; and various kinds of sensor data related to the engine control to be referred to upon remotely controlling a function such as the traveling function.

For example, in a case where the remote control unit 9 sets the air heating function or the air cooling function as the permitted operation function, the remote control unit 9 may set data including, without limitation, the vehicle inside and outside temperature data and the imaging image data around the vehicle 4 as the reference data. For example, in a case where the remote control unit 9 sets the ISS function or the EPB function as the permitted operation function, the remote control unit 9 may set data including, without limitation, the imaging image data around the vehicle 4 as the reference data. For example, in a case where the remote control unit 9 sets the traveling function as the permitted operation function, the remote control unit 9 may set data including, without limitation, the various kinds of sensor data related to the engine control, the imaging image data around the vehicle 4, and the audio data around the vehicle 4, as the reference data.

Upon setting the reference data, the remote control unit 9 may transmit remote control permission notification for the set permitted operation function to the remote control apparatus 3 via the communication control unit 11, as the communication control process in step 115.

The remote control apparatus 3 may receive the remote control permission notification from the remote control unit 9, and thereby be able to accept the remote control related to the set permitted control function.

At and after step S115, the remote control unit 9 may intermittently transmit the reference data for the permitted operation function, and the remote control apparatus 3 may display the received reference data to allow an operator present at a distant location to refer to the reference data.

Thereafter, in the remote control mode, the remote control apparatus 3 may transmit, in step S201, a control request of the operation function based on the operation input performed by the operator present at the distant location to the remote control unit 9. Upon receiving the control request as the communication control process, the remote control unit 9 may perform an operation control of the vehicle 4 in accordance with the control request in step S116, as the remote control process.

Figure 4:
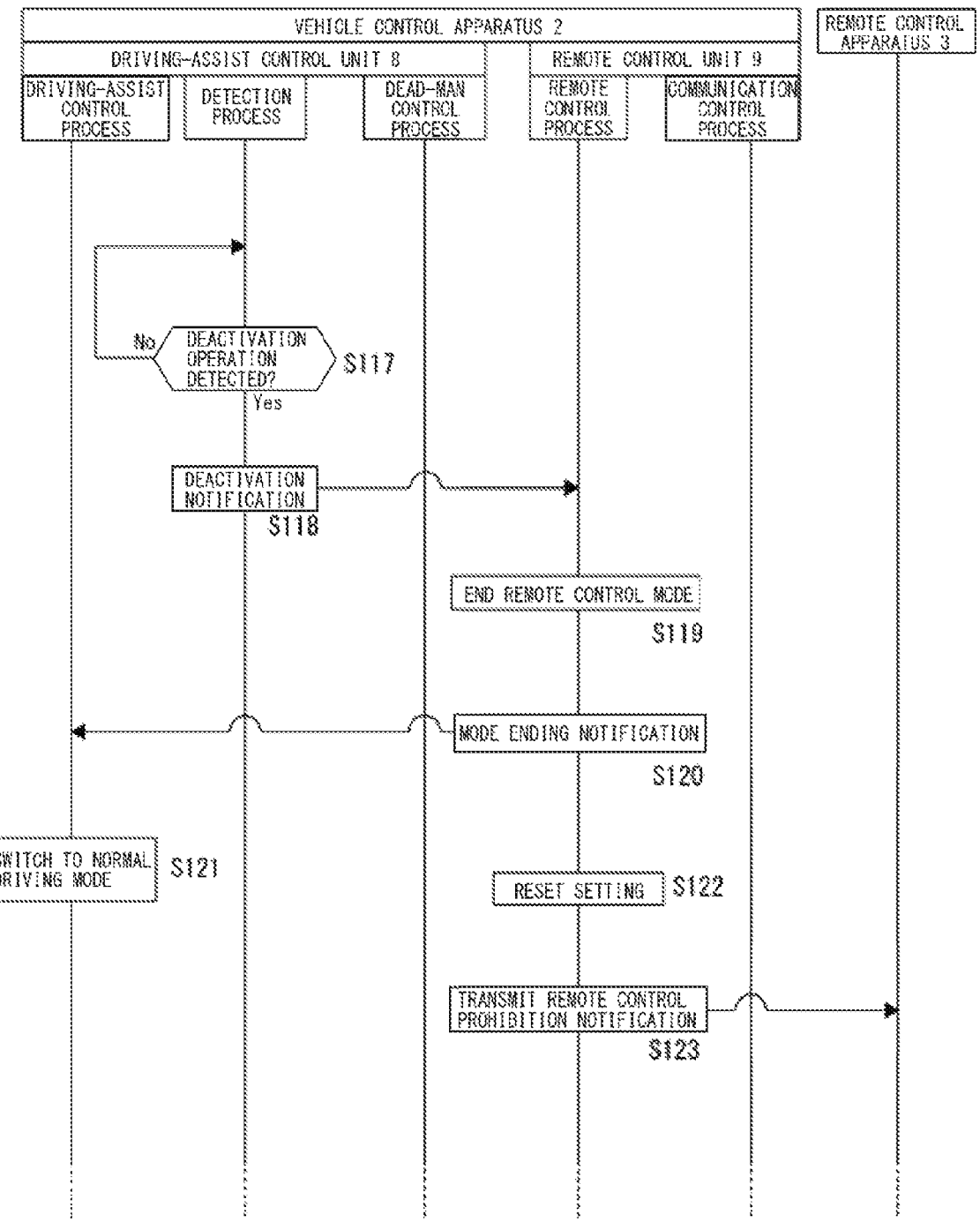
FIG. 4 is a flowchart illustrating an example of the process to be performed by the vehicle control apparatus according to one embodiment of the technology.

In the remote control mode, the driving-assist control unit 8 may wait until detecting the deactivation operation of the remote control mode in step S117 illustrated in FIG. 4, as a process of detecting recovery of the driver from the abnormal state.

The deactivation operation of the remote control mode may be performed by the driver, recovered from the abnormal state, operating an operation device provided in the vehicle 4, for example.

Figure 3:
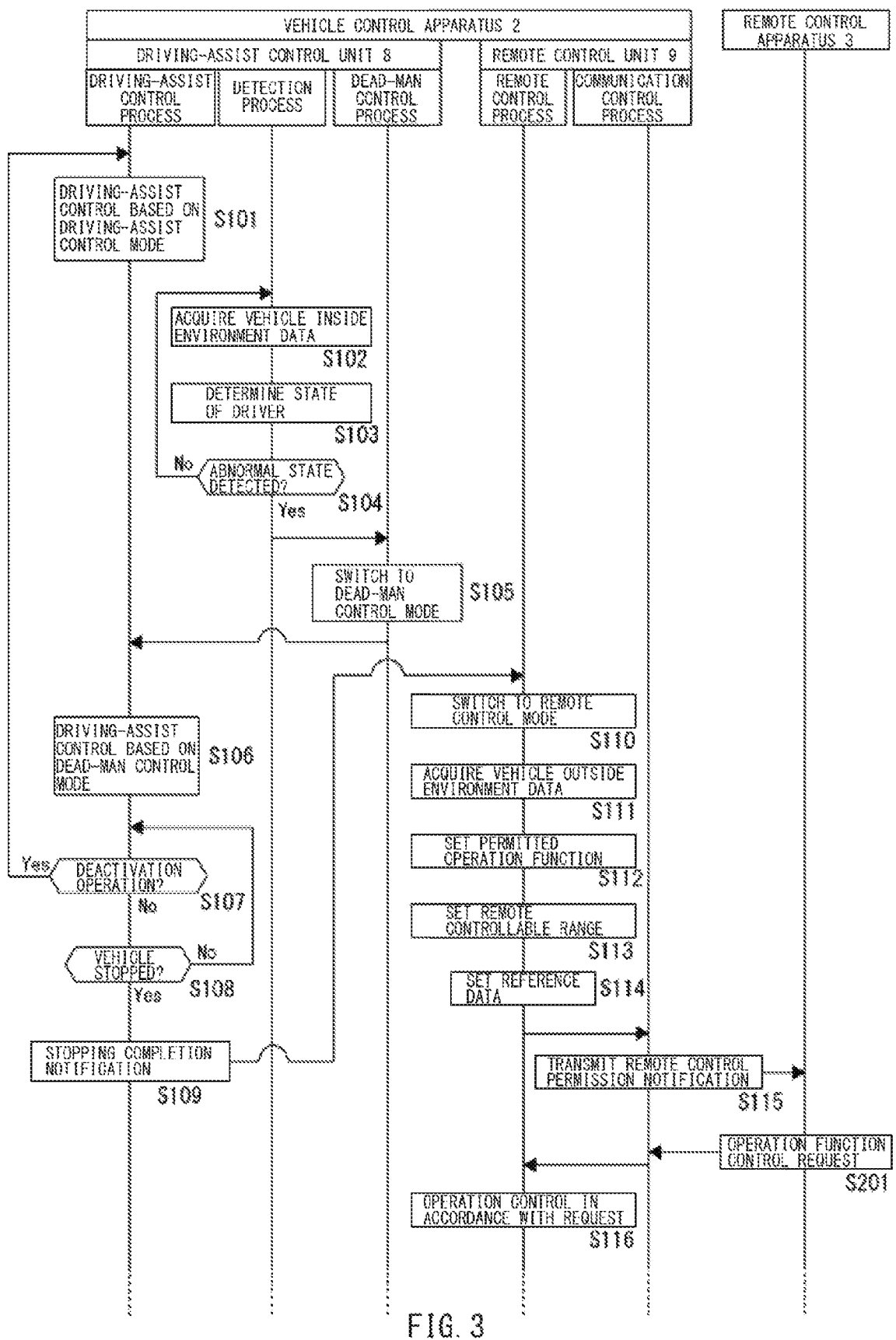
FIG. 3 is a flowchart illustrating an example of a process to be performed by the vehicle control apparatus according to one embodiment of the technology.

Note that, as described in steps S102 and S103 in FIG. 3, the driving-assist control unit 8 may determine whether the driver has recovered from the abnormal state on the basis of a result of determination of the state of the driver based on the vehicle inside environment data.

Upon detecting the deactivation operation of the remote control mode in step S117, the driving-assist control unit 8 may determine that the driver has recovered from the abnormal state. Thereafter, the driving-assist control unit 8 may transmit deactivation notification to the remote control unit 9 in step S118.

Upon receiving the deactivation notification, the remote control unit 9 may end the remote control mode in step S119, as the remote control process. Thereafter, in step S120, the remote control unit 9 may transmit mode ending notification to the driving-assist control unit 8.

Upon receiving the mode ending notification from the remote control unit 9, the driving-assist control unit 8 may switch the driving-control-related mode to a normal driving mode involving no automatic driving control in step S121, as the driving-assist control process.

The remote control unit 9 may reset the setting of the permitted operation function, the remote controllable range thereof, and the reference data thereof in step S122, as the remote control process. The remote control unit 9 may transmit remote control prohibition notification to the remote control apparatus 3 in step S123. This may return the remote control by the remote control apparatus 3 to a prohibited state for all of the operation functions of the vehicle 4.

The processes described above may allow for the example embodiment.

The vehicle control apparatus 2 according to the example embodiment of the technology includes the driving-assist control unit 8 and the remote control unit 9. The driving-assist control unit 8 is configured to perform the automatic driving control of stopping the vehicle 4 in accordance with detection of the abnormal state of the driver while the vehicle 4 is traveling. The remote control unit 9 is configured to perform a control of transmitting the remote control permission notification after the vehicle 4 is stopped by the automatic driving control. The remote control permission notification permits a remote control of the vehicle 4. (see S108, S110, S115, etc. in FIG. 3).

With this configuration, after the vehicle 4 is stopped by the automatic driving control, the operation control of the vehicle 4 may be performed not by the driver in the abnormal state but in accordance with, for example, operation performed by an operator present at a distant location.

This allows an appropriate control of the vehicle 4 to be performed in accordance with a situation in which the vehicle 4 is stopped by the automatic driving control. Accordingly, it is possible to secure safety of the occupant such as the driver in the abnormal state.

Moreover, the timing to permit the remote control of the vehicle 4 may be set to a timing after the vehicle 4 is stopped by the automatic driving control, and the remote control may not be permitted more than necessary. This helps to reduce a possibility of misuse of the remote control such as hijacking of the operation control of the vehicle 4. Accordingly, it is possible to improve security of the vehicle 4.

Moreover, the timing to permit the remote control of the vehicle 4 may be set to a timing after the vehicle 4 is stopped by the automatic driving control, and the operation may be left to the automatic driving control on the vehicle 4 side until the vehicle 4 is stopped. This helps to reduce an operation load on the operator side who is to perform the operation for the remote control.

As described above, it is possible to allow for appropriate-timing permission for the remote control of the vehicle 4.

The vehicle control apparatus 2 according to the example embodiment may perform the control of transmitting the remote control prohibition notification in accordance with detection of recovery of the driver from the abnormal state after the vehicle 4 is stopped by the automatic driving control (see S118, etc. in FIG. 4).

With this configuration, the remote control of the vehicle 4, for example, by means of operation performed by an operator present at a distant location may be permitted only during a period up to a timing of recovery of the driver from the abnormal state.

Thus limiting the period for allowing for the remote control to the minimum, it is possible to further improve security of the vehicle 4 while securing safety of the occupant such as the driver after the vehicle 4 is stopped.

The vehicle control apparatus 2 according to the example embodiment may set the permitted operation function of the vehicle 4 in accordance with the satisfaction state of the predetermined condition. The permitted operation function may be the operation function for which the remote control is performable in accordance with a remote operation signal (see S111, S112, etc. in FIG. 3).

With this configuration, the operation function of the vehicle 4 that is remotely controllable, for example, by means of operation performed by an operator present at a distant location may be limited in accordance with the satisfaction state of the predetermined condition.

Therefore, it is possible to permit the remote control for only the operation function of the vehicle 4 that is considered to be necessary for securing the safety of the occupant such as the driver in the abnormal state, when taking into consideration the satisfaction state of the predetermined condition. Thus reducing the remote controllable operation control of the vehicle 4 to the minimum makes it possible to further improve security of the vehicle 4 while securing safety of the occupant such as the driver after the vehicle 4 is stopped.

The vehicle control apparatus 2 according to the example embodiment may set, in a case where the traveling function of the vehicle 4 is set as the permitted operation function, the remote controllable range of the traveling function of the vehicle 4 in accordance with the position data of the vehicle 4 (see S113, etc. in FIG. 3).

With this configuration, the remote controllable range of the traveling function of the vehicle 4 for which the remote control is permitted may be limited in accordance with the environment data of the vehicle 4.

Thus, upon performing the traveling control by means of the remote control, the movable distance, the vehicle speed, and any other related factor may be limited to a range that is considered to be necessary to secure safety of the occupant such as the driver in the abnormal state, taking into consideration the position where the vehicle 4 is stopped. This secures the safety of the occupant such as the driver after the vehicle 4 is stopped. In addition, thus limiting the movable distance makes it possible to still further improve the security of the vehicle 4.

The vehicle control apparatus 2 according to the example embodiment may perform the control of transmitting the reference data related to the set permitted operation function after the vehicle 4 is stopped by the automatic driving control (see S114, etc. in FIG. 3).

With this configuration, in a case where the remote control of the set operation function is performed by means of operation performed by an operator, the operator may check the reference data related to the set operation function to perform the operation for the remote control.

The data to be transmitted to the operator side is thus reduced to the minimum. For example, the reference data related to non-set operation function may not be transmitted to the operator side. This helps to reduce a possibility of misuse of a function of supplying data of the vehicle 4. Accordingly, it is possible to increase security of the vehicle 4.

In addition, transmitting only the reference data related to the permitted operation function to the operator side allows for easier recognition by the operator of the reference information to be referred to upon performing operation. Accordingly, it is possible to increase operation accuracy of the operator who performs the operation for the remote control.

The vehicle control apparatus 2 according to the example embodiment may set the permitted operation function in accordance with the satisfaction state of the position condition as the predetermined condition (see S112, etc. in FIG. 3).

With this configuration, the permitted operation function may be set in accordance with the position where the vehicle 4 is stopped.

Thus, for example, the traveling function may be set as the permitted operation function in accordance with the position where the vehicle 4 is stopped. It is thereby possible to cause the stopped vehicle 4 to travel to the side of the road, for example. It is also possible to take the driver in the abnormal state to a facility such as a hospital, for example. This makes it possible to prevent an accident such as a contact of the vehicle 4 with another object, thereby securing safety of the occupant such as the driver after the vehicle 4 is stopped.

The vehicle control apparatus 2 according to the example embodiment may set the permitted operation function in accordance with the satisfaction state of the outside temperature condition as the predetermined condition (see S112, etc. in FIG. 3).

With this configuration, the permitted operation function may be set in accordance with the outside temperature of the vehicle 4.

Thus, for example, the air heating function or the air cooling function may be set as the permitted operation function in accordance with the outside temperature of the stopped vehicle 4. This helps to prevent the occupant such as the driver in the stopped vehicle 4 from having hypothermia due to the cold or from having dehydration due to the heat. Accordingly, it is possible to secure safety of the occupant such as the driver.

The vehicle control apparatus 2 according to the example embodiment may set the permitted operation function in accordance with the satisfaction state of the gradient condition as the predetermined condition (see S112, etc. in FIG. 3).

With this configuration, the permitted operation function may be set in accordance with the gradient at the position where the vehicle 4 is stopped.

Thus, for example, the EPB function may be set as the permitted operation function in accordance with the gradient at the position where the vehicle 4 is stopped. This makes it possible to set the EPB to stop the vehicle 4, helping to prevent an accident due to the movement of the vehicle 4 caused by the gradient. Accordingly, it is possible to secure safety of the occupant such as the driver.

According to the example embodiment, a description has been given with reference to an example in which, among the processes to be performed by the vehicle control apparatus 2 illustrated in FIGS. 3 and 4, the driving-assist control unit 8 may perform the driving-assist control process, the detection process, and the dead-man control process, and the remote control unit 9 may perform the remote control process and the communication control process. However, this is non-limiting, and in another example embodiment, the remote control unit 9 may also perform the driving-assist control process, the dead-man control process, or both.

According to the example embodiment described above, the determination of the abnormal state of the driver may be performed during the automatic driving control in the driving-assist control mode illustrated in step S101 in FIG. 3. However, the determination of the abnormal state of the driver is not necessarily performed in the driving-assist control mode. In another example embodiment, the vehicle control apparatus 2 may perform the processes in step S102 and the subsequent steps in FIGS. 3 and 4 also in a case where the automatic driving control is not being performed.

In still another example embodiment, the remote control apparatus 3 side may perform a portion or all of the processes in steps S112, S113, and S114 in FIG. 3 in the example embodiment described above. In this case, the remote control apparatus 3 may acquire the vehicle outside environment data of the vehicle 4 from the vehicle control apparatus 2 to perform each of the processes described above.

The example embodiment has been described with reference to some examples of the operation function including the traveling function, the air heating function, the air cooling function, the ISS function, and the EPB function. However, examples of the operation function as various control functions for the operation of the vehicle 4 may include various other operation functions. Examples of such other operation functions may include: a shift operation function of switching various shift ranges; a turn-on and turn-off operation function of lamps including headlights and hazard lamps; and an engine operation function of starting or stopping the engine.

For example, the remote control unit 9 may acquire the vehicle outside environment data from the vehicle outside environment sensor 28 in step S111 in FIG. 3. In step S112, the remote control unit 9 may determine a satisfaction state of a predetermined condition on the basis of the acquired vehicle outside environment data, and set any of the operation functions including, without limitation, the shift operation function, the turn-on and turn-off operation function of the lamps, and the engine operation function as the permitted operation function on the basis of a result of the determination.

Moreover, according to the example embodiment described above, the satisfaction state of the predetermined condition may be determined upon setting the permitted operation function. The predetermined condition may be any condition that is able to serve as a reference for setting the permitted operation function of the vehicle. Therefore, the predetermined condition is not limited to the outside temperature condition, the position condition, and the gradient condition, and may include, for example, a time condition or a brightness condition.

For example, the remote control unit 9 may acquire time data in step S111. For example, in a case where the remote control unit 9 determines that it is late at night or early in the morning, the remote control unit 9 may set the air heating function as the permitted operation function in step S112 in order to prevent the occupant such as the driver from having hypothermia. For example, in a case where the remote control unit 9 determines that it is daytime, the remote control unit 9 may set the air cooling function as the permitted operation function in step S112 in order to prevent the occupant such as the driver from having dehydration.

In another example, the remote control unit 9 may acquire data related to brightness outside the vehicle 4 from a sensor such as the vehicle outside imaging sensor or an illumination sensor provided as the vehicle outside environment sensor 28. For example, in a case where the remote control unit 9 determines that it is dark outside the vehicle 4 on the basis of brightness lower than or equal to a predetermined threshold, the remote control unit 9 may set the turn-on and turn-off operation function of the lamps including the headlights and the hazard lamps as the permitted operation function.

According to the example embodiment described above, the remote control unit 9 may set the permitted operation function in accordance with the satisfaction state of the predetermined condition. In one example embodiment, the remote control unit 9 may permit the remote control for only a portion of functions related to the operation function set as the permitted operation function in accordance with the satisfaction state of the predetermined condition.

For example, regarding the outside temperature condition, the remote control unit 9 may permit the remote control of all of the functions (e.g., a seat heating function and an air conditioning function) related to the air heating function in a case where the outside temperature is extremely low. In a case where the outside temperature is not so low, the remote control unit 9 may permit the remote control of only the seat heating function related to the air heating function, and may not permit the remote control of the air conditioning function.

In another example, regarding permission for the remote control of the air conditioning function related to the air heating function, the remote control unit 9 may change a settable temperature range of the air conditioning in accordance with the satisfaction state of the outside temperature condition. For example, the remote control unit 9 may set the settable temperature range to be higher for the case where the outside temperature is extremely low than for the case where the outside temperature is not so low.

Note that the term "GPS" used in the example embodiments described above does not limitedly refer to the "global positioning system" operated by the US, but also encompasses a "global navigation satellite system (GNSS)" which is a general satellite positioning system.

Note that the effects described in the disclosure are merely illustrative and non-limiting. Any other effect may be achieved, or part of the effects described in the disclosure may be achieved.

Although some embodiments of the technology have been described in the foregoing by way of example, the technology is by no means limited to the embodiments described above. It should be appreciated that modifications and alterations may be made in accordance with a factor such as a design by persons skilled in the art without departing from the scope as defined by the appended claims. The technology is intended to include such modifications and alterations in so far as they fall within the scope of the appended claims or the equivalents thereof. Further, it may not be necessary to provide all of the combination of the configurations described above in the example embodiments.

Each of the engine control unit 5, the brake control unit 6, the hybrid control unit 7, the driving-assist control unit 8, the remote control unit 9, the display control unit 10, the communication control unit 11, the rotating electrical device controller 26, and the charge controller 27 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the engine control unit 5, the brake control unit 6, the hybrid control unit 7, the driving-assist control unit 8, the remote control unit 9, the display control unit 10, the communication control unit 11, the rotating electrical device controller 26, and the charge controller 27 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the engine control unit 5, the brake control unit 6, the hybrid control unit 7, the driving-assist control unit 8, the remote control unit 9, the display control unit 10, the communication control unit 11, the rotating electrical device controller 26, and the charge controller 27 illustrated in FIG. 2.

The invention claimed is:

1. A vehicle control apparatus comprising one or more processors, and one or more memories that store instructions for causing the one or more processors to execute the instructions to:
   perform an automatic driving control of stopping a vehicle in accordance with detection of an abnormal state of a driver of the vehicle while the vehicle is traveling;
   perform a control of transmitting remote control permission notification after the vehicle is stopped by the automatic driving control, the remote control permission notification permitting a remote control of the vehicle by a remote control apparatus;
   acquire vehicle outside environment data from a vehicle outside environment sensor;
   set a permitted operation function of the vehicle for which the remote control by the remote control apparatus is permitted based on the vehicle outside environment data;
   acquire, from the vehicle outside environment sensor, as the vehicle outside environment data, i) temperature data indicating an outside temperature of the vehicle, ii) position data indicating a position of the vehicle, and iii) gradient data indicating a gradient of the position of the vehicle; and
   select, as the permitted operation function, at least one of an air heating function, an air cooling function, an idling stop system function, a traveling function or an electronic parking brake function.

2. The vehicle control apparatus according to claim 1, wherein the at least one processor is configured to execute the instructions to perform a control of transmitting remote control prohibition notification in accordance with detection of recovery of the driver from the abnormal state after the vehicle is stopped by the automatic driving control, the remote control prohibition notification prohibiting the remote control of the vehicle.

3. The vehicle control apparatus according to claim 2, wherein the permitted operation function of the vehicle is set in accordance with a satisfaction state of a predetermined condition, the permitted operation function being an operation function for which the remote control is performable in accordance with a remote operation signal.

4. The vehicle control apparatus according to claim 3, wherein, in a case where the traveling function of the vehicle is set as the permitted operation function, a remote controllable range of the traveling function of the vehicle is set in accordance with the position data of the vehicle.

5. The vehicle control apparatus according to claim 4, wherein a control of transmitting reference data related to the set permitted operation function is performed after the vehicle is stopped by the automatic driving control.

6. The vehicle control apparatus according to claim 3, wherein a control of transmitting reference data related to the set permitted operation function is performed after the vehicle is stopped by the automatic driving control.

7. The vehicle control apparatus according to claim 1, wherein the permitted operation function of the vehicle is set in accordance with a satisfaction state of a predetermined condition, the permitted operation function being an operation function for which the remote control is performable in accordance with a remote operation signal.

8. The vehicle control apparatus according to claim 7, wherein, in a case where the traveling function of the vehicle is set as the permitted operation function, a remote controllable range of the traveling function of the vehicle is set in accordance with the position data of the vehicle.

9. The vehicle control apparatus according to claim 8, wherein a control of transmitting reference data related to the set permitted operation function is performed after the vehicle is stopped by the automatic driving control.

10. The vehicle control apparatus according to claim 7, wherein a control of transmitting reference data related to the set permitted operation function is performed after the vehicle is stopped by the automatic driving control.

11. The vehicle control apparatus according to claim 1, wherein the at least one processor is configured to execute the instructions to set a type of reference data to be sent to the remote control apparatus based on the permitted operation function.

12. The vehicle control apparatus according to claim 11,
wherein when the traveling function is selected as the permitted operation function, the at least one processor is configured to execute the instructions to include sensor data related to an engine control of the vehicle and an audio data around the vehicle to the reference data, and
wherein when the traveling function is not selected as the permitted operation function, the at least one processor is configured to execute the instructions to exclude the sensor data related to the engine control of the vehicle and the audio data around the vehicle to the reference data.

13. The vehicle control apparatus according to claim 1, wherein the at least one processor is configured to execute the instructions to:
set the electronic parking brake function as the permitted operation function based on result of a comparison of the temperature data with a predetermined temperature condition.

14. The vehicle control apparatus according to claim 1, wherein the at least one processor is configured to execute the instructions to:
set the air heating function or the air cooling function as the permitted operation function based on result of a comparison of the position data with a predetermined position condition.

15. The vehicle control apparatus according to claim 1, wherein the at least one processor is configured to execute the instructions to:
set the air heating function or the air cooling function as the permitted operation function based on i) result of a comparison of the temperature data with a predetermined temperature condition and ii) result of a comparison of the position data with a predetermined position condition.

16. A vehicle control apparatus comprising one or more processors, and one or more memories that store instructions for causing the one or more processors to execute the instructions to:
perform an automatic driving control of stopping a vehicle in accordance with detection of an abnormal state of a driver of the vehicle while the vehicle is traveling;
perform a control of transmitting remote control permission notification after the vehicle is stopped by the automatic driving control, the remote control permission notification permitting a remote control of the vehicle by a remote control apparatus;
acquire vehicle outside environment data from a vehicle outside environment sensor;
set a permitted operation function of the vehicle for which the remote control by the remote control apparatus is permitted based on the vehicle outside environment data;
acquire, from the vehicle outside environment sensor, temperature data indicating an outside temperature of the vehicle as the vehicle outside environment data; and
set an air heating function or an air cooling function as the permitted operation function based on result of a comparison of the temperature data with a predetermined temperature condition.

17. The vehicle control apparatus according to claim 16, wherein the at least one processor is configured to execute the instructions to further set an idling stop system function as the permitted operation function based on the result of the comparison of the temperature data with the predetermined temperature condition.

18. A vehicle control apparatus comprising one or more processors, and one or more memories that store instructions for causing the one or more processors to execute the instructions to:
perform an automatic driving control of stopping a vehicle in accordance with detection of an abnormal state of a driver of the vehicle while the vehicle is traveling;
perform a control of transmitting remote control permission notification after the vehicle is stopped by the automatic driving control, the remote control permission notification permitting a remote control of the vehicle by a remote control apparatus;
acquire vehicle outside environment data from a vehicle outside environment sensor;
set a permitted operation function of the vehicle for which the remote control by the remote control apparatus is permitted based on the vehicle outside environment data;
acquire, from the vehicle outside environment sensor, gradient data indicating a gradient of a position of the vehicle as the vehicle outside environment data; and
set an electronic parking brake function as the permitted operation function based on result of a comparison of the gradient data with a predetermined gradient condition.

* * * * *